Sept. 22, 1959　　　W. J. SMITH　　　2,904,828
SPINNERET FILTER PACK
Filed Jan. 6, 1958　　　　　　2 Sheets-Sheet 1
FIG.1
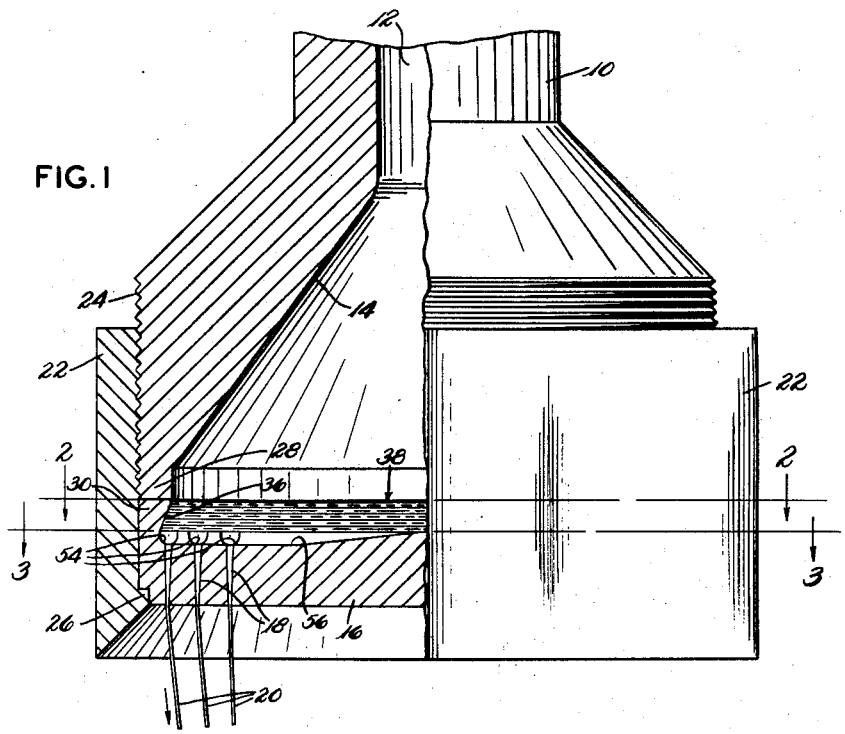
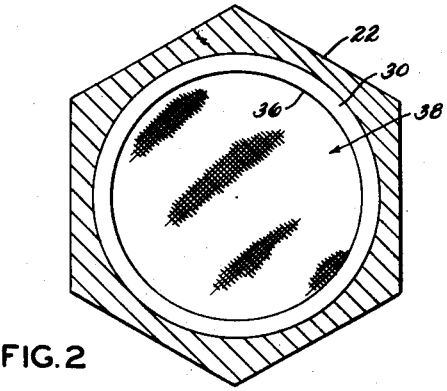
FIG.2
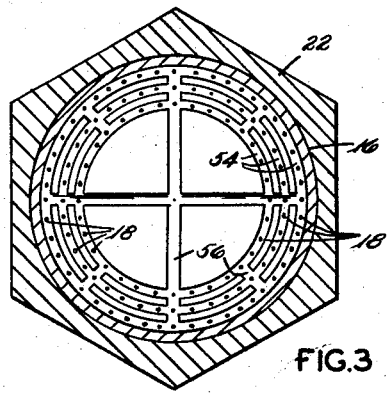
FIG.3
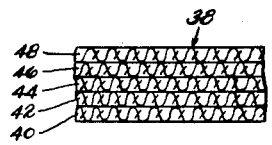
FIG.4
INVENTOR.
WALTER J. SMITH
BY *W. A. Fraser*
ATTY.

Sept. 22, 1959 W. J. SMITH 2,904,828
SPINNERET FILTER PACK
Filed Jan. 6, 1958 2 Sheets-Sheet 2

INVENTOR.
WALTER J. SMITH
BY
W. A. Fraser
ATTY.

United States Patent Office 2,904,828
Patented Sept. 22, 1959

2,904,828

SPINNERET FILTER PACK

Walter J. Smith, Royersford, Pa., assignor to The Firestone Tire & Rubber Company, Akron, Ohio, a corporation of Ohio Application January 6, 1958, Serial No. 707,168

6 Claims. (Cl. 18—8)

This invention relates to a novel filter pack for spinnerets used in the melt-spinning of thermoplastic filaments.

In the melt-spinning of filaments of thermoplastic resins, it is the practice to interpose a flow-restricting and filtering medium or filter-pack in the path of the molten resin at a point as close as possible in advance of the filament-spinning orifices in the spinning die. The purpose of the filter pack is twofold; first, to strain out any solid particles of foreign material, decomposed resin or the like which may be entrained in the molten resin; and second, to develop a back pressure in the resin upstream of the filter pack, so as to cause any gas bubbles in the resin to dissolve in the resin and/or be broken up by passage through the filter pack. After the passage through the filter pack, a certain proportion of the gases dissolved in the molten resin will be re-liberated; but the bubbles so formed (and also the bubbles which were never completely dissolved, but were broken up by the filter pack) are sufficiently small that no individual bubble is large enough to materially weaken the filament at the cross-section at which it occurs.

Filter packs suitable for the melt-spinning of thermoplastic filaments must meet a number of very stringent qualifications. First, they must not be deteriorated by, nor cause deterioration of, the resin. Secondly, they must be resistant to fluid erosion, so that particles thereof will not be carried away to plug up the spinneret orifices or form inclusions in the filament. Further, the openings in the pack must be as fine as possible, so as to provide the maximum resistance to flow with a minimum thickness. It will be appreciated that the pressure drops off in the downstream direction throughout the thickness of the filter pack, so that a considerable proportion of the downstream thicknesses of the filter pack must be considered as "downstream inventory" i.e., regions of the molten resin in which bubbles may reform and re-coalesce. Still further, the filter pack should have good mechanical strength and be otherwise adapted to be located as close as possible to the spinneret orifices, so as to minimize the "downstream inventory" of molten resin. Finally, it is desirable that the filter pack be cheap enough to be discarded after each run on the spinning apparatus. Stacked metal screens of 300 mesh or finer have been used for filter packs, but suffer from the disadvantage of being expensive, since they must be as fine as possible and must be of non-corrosive material; also they cannot be made as fine as would be desirable to reduce the thickness of the pack and to minimize the downstream inventory of resin. Fine sand and other granular materials backed by metal screens have also been used as filter packs. Such arrangements have the disadvantage that, particularly during the earlier portions of the operation, ultra-fine particles of sand are dislodged and either plug the spinneret orifices or become incorporated as inclusions in the filament so as to weaken the same.

Accordingly, it is an object of this invention to provide a novel and improved filter pack for thermoplastic filament extrusion spinnerets.

Another object is to provide such a filter pack which will not cause deterioration of, or be deteriorated by, molten thermoplastic resins.

A further object is to provide such a filter pack which will not be subject to mechanical erosion by the flow of molten resin.

A further object is to provide a filter pack which will provide a very high degree of back-pressure for any given thickness.

A still further object is to provide a filter pack, the mechanical properties and structure of which enable it to be positioned with a very small clearance with respect to the spinneret orifices, so as to minimize the downstream inventory of resin in the spinneret assembly.

A still further object is to provide a filter pack which is cheap enough to be discarded after each run of the spinneret in which it is incorporated.

In general, the above and other objects are secured, in accordance with this invention, by the use of filter packs, the filtering media of which comprise closely woven fabrics of fine glass filaments. Such fabrics are commercially made from glass filaments having individual diameters in the approximate range of .0002 to .0010 inch, a number of these filaments being spun into yarns or threads, which are in turn woven into fabrics. In general, the glass fabrics used in this invention should be of fairly close and tight weave, say with thread counts of 20 to 90 threads per inch in either direction, and should be of weights varying from about 5 to over 50 ounces per square yard. It will be understood that, in contrast with the flow of molten resin through the metal screen packs heretofore employed, the filtration action will be through the interstices between the individual glass filaments, rather than through any gross apertures through the fabric as a whole at the crossovers of the composite threads in the weave; these gross apertures are closed up by the tightness of the weave and the compacting action of the pressure of the molten resin.

The invention also contemplates that the glass fabric may be supported, on one or both sides, by metallic screens. The screens need not be of the extreme fineness required in screens which are designed to serve as filter packs themselves, since their principal function will be merely to provide support and protect the glass fabric from mechanical damage. Metal screens suitable for this purpose will range from 40 to 200 mesh.

The invention will be described in connection with the annexed drawing, in which Fig. 1 is a front view, partially in section, of a spinneret having a filter pack in accordance with this invention Fig. 2 is a horizontal section on the line 2—2 of Fig. 1

Fig. 3 is a horizontal section on the line 3—3 of Fig. 1,

Fig. 4 is a detail view of the filter pack of Fig. 1,

Figure 5:
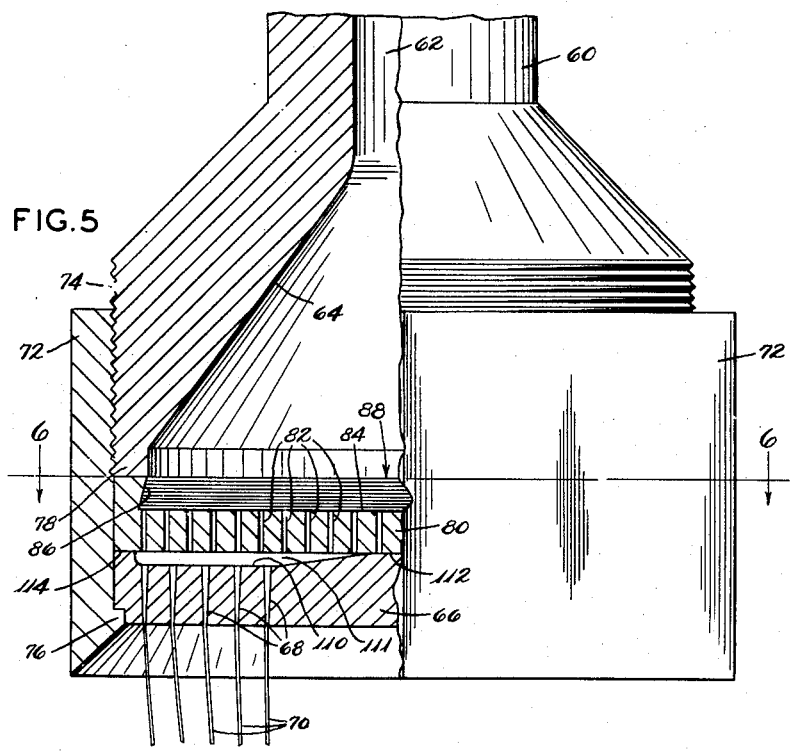
Fig. 5 is a front view, partially in section, of a spinneret having a modified filter pack in accordance with this invention.

Referring now to the drawings, and particularly to Figs. 1–4, there is shown a spinneret assembly comprising a supply neck 10 (broken off at the top) having a passage 12 therein for receiving molten thermoplastic resin from a device (not shown) for supplying molten resin under pressure, examples of suitable devices being rotary screw extruders, melting grids with gear pumps, or the like. The passage 12 enlarges at its lower end into a plenum chamber 14, the floor of which is formed by an orifice die plate 16, having the spinning orifices 18 therein through which the resin is extruded as filaments 20. The die plate 16 is supported against the downward pressure of the molten resin in the plenum chamber 14 by means of a nut 22 threaded upon threads 24 on the exterior of the chamber 14, and having an inwardly directed flange 26 extruding under, and supporting, the outer peripheral portions of the die plate 16. Above the die plate 16, and clamped between the periphery of the die plate and a shoulder 28 on the supply neck 10, is an annular spacer ring 30, in the interior of which is disposed a filter pack 38 according to this invention. The molten resin entering the passage 12 flows down into the plenum chamber 14 and thence through the filter pack 38, and out through the spinneret orifices 18 which extrude the resin in the form of filaments 20.

The filter pack 38 is made up from a plurality of superposed layers of glass fabric and relatively coarse wire mesh, shown in detail in Fig. 4 and listed herewith in the order in which they are superposed, beginning at die plate 16.

Table I

| Nature of Layer | Reference Character |
|---|---|
| Stainless steel wire fabric 100 mesh, .004″ diameter wire | 40 |
| Stainless steel wire fabric 150 mesh, .0028″ diameter wire | 42 |
| Glass fabric; 42 x 36 count, satin weave, 25 oz./sq. yd., 75's yarn | 44 |
| Stainless steel wire fabric 150 mesh, .0028″ diameter wire | 46 |
| Stainless steel wire fabric 100 mesh, .004″ diameter wire | 48 |

The function of the metal fabric layers 40, 42, 46 and 48 is to support the glass fabric 44 and to distribute the flow of molten resin to and from the very much finer pores of the glass fabric; the interstices of the wire mesh are much too coarse to serve as a filter-pack medium. It will be understood that the passage of the molten resin through the glass fabric 44 is by way of the interstices between the ultimate fibers in the yarns from which the fabric is woven, rather than through any gross interstices between the yarns as a whole in the weave, as these latter interstices are closed by the tightness of the weave and the pressure exerted by the flow of the resin.

In order to assist and equalize the distribution and flow of resin to the orifices 18, the orifices 18 are placed in concentric circles, and the upper face of the die plate 16 has circular grooves 54 therein intersecting the upper ends of the orifices 18. Intersecting the circular grooves 54 are a plurality of radial grooves 56 disposed so as to equalize the pressure and flow of the molten resin as between the circular grooves 54.

In a typical construction in accordance with Figs. 1–4, the portion of the die 16 exposed to the flow of resin had a diameter of 3½″; the grooves 54, 56 had radii of .0625″; and there were a total of 136 orifices 18, each having a diameter of .012″. Under these conditions, a flow of 25 lbs. per hour of a polycaprolactam nylon supplied to the spinneret at a temperature of 515° F., produced a back pressure of 1800 p.s.i. This is a favorable value of back pressure in relation to the extreme compactness of the filter pack, which had an overall thickness of only about .070″. With the structure described, the inventory of resin downstream of the filter pack is only about 50 grams, or about 28% of the flow per minute of the resin. The apparatus produced clean filament from the very start of operation, i.e., there was no carry-through of debris from the filter pack as in the case of a sand filter, and at the close of an 8-hour shift run, the filter pack, when removed, showed no signs of decomposition of the resin within the interstices thereof. The cost of the fabric is negligible and, over the course of commercial operations, can be thrown away at each die change and replaced with a new filter pack.

Similar results were obtained, with corresponding differences in back pressure, when the glass fabric 44 described above was replaced by the following glass fabrics:

64 x 60 count, square weave 6.70 oz./sq. yd., 75's yarn
54 x 48 count, square weave 25.9 oz./sq.yd., 75's yarn
57 x 54 count, satin weave 9.50 oz./sq. yd., 75's yarn
42 x 35 count, satin weave 24.5 oz./sq. yd., 75's yarn Likewise, good results were obtained when the single layer of glass fabric 44 was replaced with two superposed glass fabrics with 57 x 54 count, satin weave, weighing 9.50 ounce per square yard woven from 75's yarn.

Figure 6:
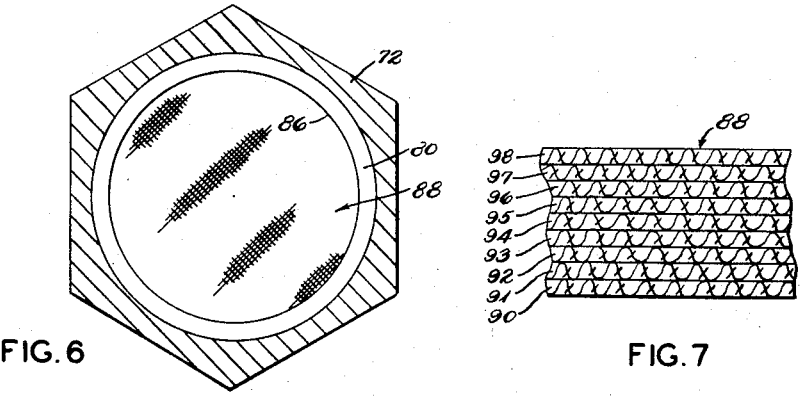
Fig. 6 is a section on the line 6—6 of Fig. 5.
Figure 7:
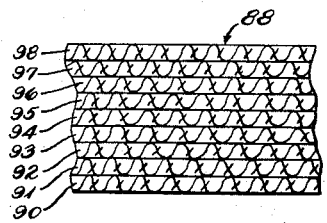
Fig. 7 is a detail view of the filter pack of Fig. 5.

Referring now to Figs. 5–7, there is shown an alternative spinneret assembly according to this invention, comprising a supply neck 60 (broken off at the top) having a passage 62 therein for receiving molten thermoplastic resin from a device (not shown) for supplying molten resin under pressure. The passage 62 enlarges at its lower end into a plenum chamber 64, the floor of which is formed by an orifice die plate 66, having the spinning orifices 68 therein through which the resin is extruded as filaments 70. The die plate 66 is supported against the downward pressure of the molten resin in the plenum chamber 64 by means of a nut 72 threaded upon threads 74 on the exterior of the chamber 64, and having an inwardly directed flange 76 extending under, and supporting, the outer peripheral portions of the die plate 66. Above the die plate 66, and clamped between the periphery of the die plate and a shoulder 78 on the supply neck 60, is a breaker plate 80 having a plurality of distributing holes 82 therethrough. A recess 84 having undercut shoulders 86 is formed in the top surface of the breaker plate, in which recess is disposed a filter pack 88 according to this invention. The molten resin entering the passage 62 flows down into the plenum chamber 64 and thence through the filter pack 88, through the holes 82 in the breaker plate 80, and out through the spinneret orifices 68 which extrude the resin in the form of filaments 70.

The filter pack 88 is made up from a plurality of superposed layers of glass fabric and relatively coarse wire mesh, shown in detail in Fig. 7 and listed herewith in the order in which they are superposed, beginning at the breaker plate 80:

Table II

| Nature of Layer | Reference Character |
|---|---|
| Stainless steel wire fabric 100 mesh, .004″ diameter wire | 90 |
| Stainless steel wire fabric 150 mesh, .0028″ diameter wire | 91 |
| Glass fabric 54 x 48 count, satin weave 25.9 oz./sq. yd., 75's yarn | 92 |
| Stainless steel wire fabric 150 mesh, .0028″ diameter wire | 93 |
| Glass fabric 42 x 36 count, satin weave, 25 oz./sq. yd., 75's yarn | 94 |
| Stainless steel wire fabric 150 mesh, .0028″ diameter wire | 95 |
| Glass fabric 42 x 36 count, satin weave, 25 oz./sq. yd., 75's yarn | 96 |
| Stainless steel wire fabric 150 mesh, .0028″ diameter wire | 97 |
| Stainless steel wire fabric 100 mesh, .004″ diameter wire | 98 |

The greater density of the glass fabric layer 92 in relation to that of the glass fabric layer 96 further upstream in the filter pack provided a desirable gradation in the filtering and pressure build-up action of the filter pack.

The breaker plate 80 serves to space the filter pack 88 from the die plate 66, and also, by means of the perforations 82, to transmit and distribute the flow of molten resin from the filter pack 88 to the orifices 68 in the die plate. In order to assist and equalize this distribution, the top space of the die plate 66 is relieved at 110 to provide an annular free space 111 in the area above the orifices 68, lands 112 and 114 being left in the center and at the periphery of the breaker plate 80 to provide support for the breaker plate 80. It will be understood that, instead of being provided with an annular free space 111, the die plate 66 might be provided with grooves similar to those shown in Fig. 3. Excellent results comparable to those obtained as described in connection with Figs. 1–4 were also obtained with the apparatus of Figs. 5–7. The construction of Figs. 5–7 is of particular advantage where the die plate 66 is of large diameter, say larger than six inches; the breaker plate to a large extent relieves the more delicate and expensive die plate of the hydraulic thrust of the molten resin in the plenum chamber 64. Using the breaker plate 80, with a plurality of relatively small orifices 82, it is also possible to use the glass fabric alone without using wire mesh support screens. In this case one or more layers of glass fabric may be supported only by the breaker plate; however, the arrangement shown, using wire mesh, is very much more secure from mechanical damage, and is preferred.

From the foregoing general description and specific constructional details and instructions for operation, it will be evident that this invention provides a novel and improved filter pack for the melt-extrusion of resinous filaments which has a favorable ratio of back-pressure to thickness, good clarity of filtrate at all stages in its operation, and a structure which permits of low inventory space in the low-pressure regions of the filter pack and also downstream of the filter pack. The filter packs do not adversely affect, and are not adversely affected by, the flowing molten resin. The filter packs are, moreover, cheap enough to be discarded periodically, saving the expense and difficulties involved in cleaning a filter pack.

What is claimed is:

1. A spinneret for the melt-spinning of thermoplastic nylon, comprising a plenum chamber for receiving molten nylon from a source adapted to supply molten nylon under high pressure, a die plate in communication with said chamber and provided with a plurality of die orifices therethrough arranged to receive molten nylon from the plenum chamber and to spin the same as filaments, and a filter pack interposed between the plenum chamber and the die plate comprising woven glass filament fabric said glass filament fabric having a weight of 5 to 50 ounces per square yard, a thread count of 20 to 90 threads per inch in both directions, the threads being spun from a number of glass filaments having individual diameters in the range of .0002 to .0010 inch, and the fabric as a whole being compacted so as to close the gross apertures at the crossovers in the weave of the fabric and to force the molten nylon to pass through the interstices between the individual glass filaments in the threads.

2. A spinneret for the melt-spinning of thermoplastic nylon, comprising a plenum chamber for receiving molten nylon from a source adapted to supply molten resin under high pressure, a die plate in communication with said chamber and provided with a plurality of die orifices therethrough arranged to receive molten nylon from the plenum chamber and to spin the same as filaments, and a filter pack interposed between the plenum chamber and the die plate comprising a woven glass filament fabric, and at least one layer of relatively coarse wire mesh, interposed between the glass fabric and the die plate said glass filament fabric having a weight of 5 to 50 ounces per square yard, a thread count of 20 to 90 threads per inch in both directions, the threads being spun from a number of glass filaments having individual diameters in the range of .0002 to .0010 inch, and the fabric as a whole being compacted so as to close the gross apertures at the crossovers in the weave of the fabric and to force the molten nylon to pass through the interstices between the individual glass filaments in the threads.

3. A spinneret for the melt-spinning of thermoplastic nylon, comprising a plenum chamber for receiving molten nylon from a source adapted to supply molten nylon under high pressure, a die plate in communication with said chamber and provided with a plurality of die orifices therethrough arranged to receive molten nylon from the plenum chamber and to spin the same as filaments, and a filter pack interposed between the plenum chamber and the die plate comprising, in the following order, going away from the die plate, at least one layer of relatively coarse wire screen, a layer of woven glass filament fabric, and at least one layer of wire mesh said glass filament fabric having a weight of 5 to 50 ounces per square yard, a thread count of 20 to 90 threads per inch in both directions, the threads being spun from a number of glass filaments having individual diameters in the range of .0002 to .0010 inch, and the fabric as a whole being compacted so as to close the gross apertures at the crossovers in the weave of the fabric and to force the molten nylon to pass through the interstices between the individual glass filaments in the threads.

4. A spinneret for the melt-spinning of thermoplastic nylon, comprising a plenum chamber for receiving molten nylon from a source adapted to supply molten nylon under high pressure, a die plate in communication with said chamber and provided with a plurality of die orifices therethrough arranged to receive molten nylon from the plenum chamber and to spin the same as filaments, a filter pack interposed between the plenum chamber and the die plate comprising at least one layer of a woven glass filament fabric, at least one layer of relatively coarse wire mesh, the glass fabric being on the side of the wire mesh away from the die plate, and a perforated breaker plate between the wire mesh and the die plate, said die plate having a plurality of shallow grooves formed in the surface thereof in contact with the breaker plate, the grooves serving to distribute the flow and pressure of the nylon over the surface of the die plate and to conduct the molten nylon to the orifices said glass filament fabric having a weight of 5 to 50 ounces per square yard, a thread count of 20 to 90 threads per inch in both directions, the threads being spun from a number of glass filaments having individual diameters in the range of .0002 to .0010 inch, and the fabric as a whole being compacted so as to close the gross apertures at the crossovers in the weave of the fabric and to force the molten nylon to pass through the interstices between the individual glass filaments in the threads.

5. A spinneret for the melt-spinning of thermoplastic nylon, comprising a plenum chamber for receiving molten nylon from a source adapted to supply molten nylon under high pressure, a die plate in communication with said chamber and provided with a plurality of die orifices therethrough arranged to receive molten nylon from the plenum chamber and to spin the same as filaments, a filter pack interposed between the plenum chamber and the die plate comprising a woven glass filament fabric, a plurality of layers of relatively coarse wire mesh, the glass fabric being on the side of the wire mesh away from the die plate, and a perforated breaker plate between the wire mesh and the die plate, said die plate being relieved on the side thereof adjacent the breaker plate, to provide a free space to distribute the flow and pressure of the nylon over the surface of the die plate and to conduct the molten nylon to the orifices said glass filament fabric having a weight of 5 to 50 ounces per square yard, a thread count of 20 to 90 threads per inch in both directions, the threads being spun from a number of glass filaments having individual diameters in the range of .0002 to .0010 inch, and the fabric as a whole being compacted so as to close the gross apertures at the crossovers in the weave of the fabric and to force the molten nylon to pass through the interstices between the individual glass filaments in the threads.

6. A spinneret for the melt-spinning of thermoplastic nylon, comprising a plenum chamber for receiving molten nylon from a source adapted to supply molten nylon under high pressure, a die plate in communication with said chamber and provided with a plurality of die orifices therethrough arranged to receive molten nylon from the plenum chamber and to spin the same as filaments, and a filter pack interposed between the plenum chamber and the die plate comprising, in successive order beginning nearest the die plate, at least one layer of relatively coarse wire mesh, at least one layer of a woven glass filament fabric, at least one layer of relatively coarse wire mesh, at least one layer of a woven glass filament fabric, and at least one layer of a relatively coarse wire mesh fabric said glass filament fabric having a weight of 5 to 50 ounces per square yard, a thread count of 20 to 90 threads per inch in both directions, the threads being spun from a number of glass filaments having individual diameters in the range of .0002 to .0010 inch, and the fabric as a whole being compacted so as to close the gross apertures at the crossovers in the weave of the fabric and to force the molten nylon to pass through the interstices between the individual glass filaments in the threads.

References Cited in the file of this patent

UNITED STATES PATENTS

| | | |
|---|---|---|
| 2,278,875 | Graves | Apr. 7, 1942 |
| 2,589,870 | Sale et al. | Mar. 18, 1952 |
| 2,820,985 | Cresswell | Jan. 28, 1958 |